United States Patent [19]
Collins et al.

[11] Patent Number: 5,375,403
[45] Date of Patent: Dec. 27, 1994

[54] LOWBUSH BERRY HARVESTER

[75] Inventors: George E. Collins, Southampton; John E. Collins, Springhill; Michael G. Collins, Sackville, all of Canada

[73] Assignee: Collins Border Holdings Ltd., Nova Scotia, Canada

[21] Appl. No.: 141,992

[22] Filed: Oct. 28, 1993

[51] Int. Cl.⁵ ..................... A01D 46/20; A01D 46/24
[52] U.S. Cl. ................. 56/330; 56/DIG. 10
[58] Field of Search ............. 56/6, 130, 328.1, 330, 56/DIG. 10

[56] References Cited

U.S. PATENT DOCUMENTS

| | | | |
|---|---|---|---|
| 3,648,447 | 3/1972 | Burton | 56/330 |
| 4,790,127 | 12/1988 | Nason et al. | 56/330 |

FOREIGN PATENT DOCUMENTS

| | | |
|---|---|---|
| 961275 | 1/1975 | Canada . |
| 1249727 | 2/1989 | Canada . |

*Primary Examiner*—David J. Bagnell
*Attorney, Agent, or Firm*—Jones, Tullar & Cooper

[57] ABSTRACT

The invention relates to a harvester for lowbush berries such as wild blueberries. A truss section is mounted to the three-point hitch of a tractor adapted to run in reverse, the truss section pulling a pair of laterally and longitudinally offset picking heads contained within the periphery of the truss section. The picking heads are floatingly connected to the truss section so that they are free to follow the contours of the ground. Each picking head mounts a rotating, tine-carrying reel therein and is connected to one end of a counterbalance system, the other end of the system being carried by the tractor. The counterbalance system includes counterweights that can be raised or lowered between upper and lower limits at the will of the operator so as to offset the weight of the picking head, so that as little as 25% thereof is acting on the ground. This means that there will be little damage to the picking head if it encounters obstacles such as rocks or tree stumps during harvesting. The counterbalance system can also be used to raise the entire head clear of the ground to pass over obstacles or to permit travel of the harvester to or from the fields to be harvested.

13 Claims, 12 Drawing Sheets

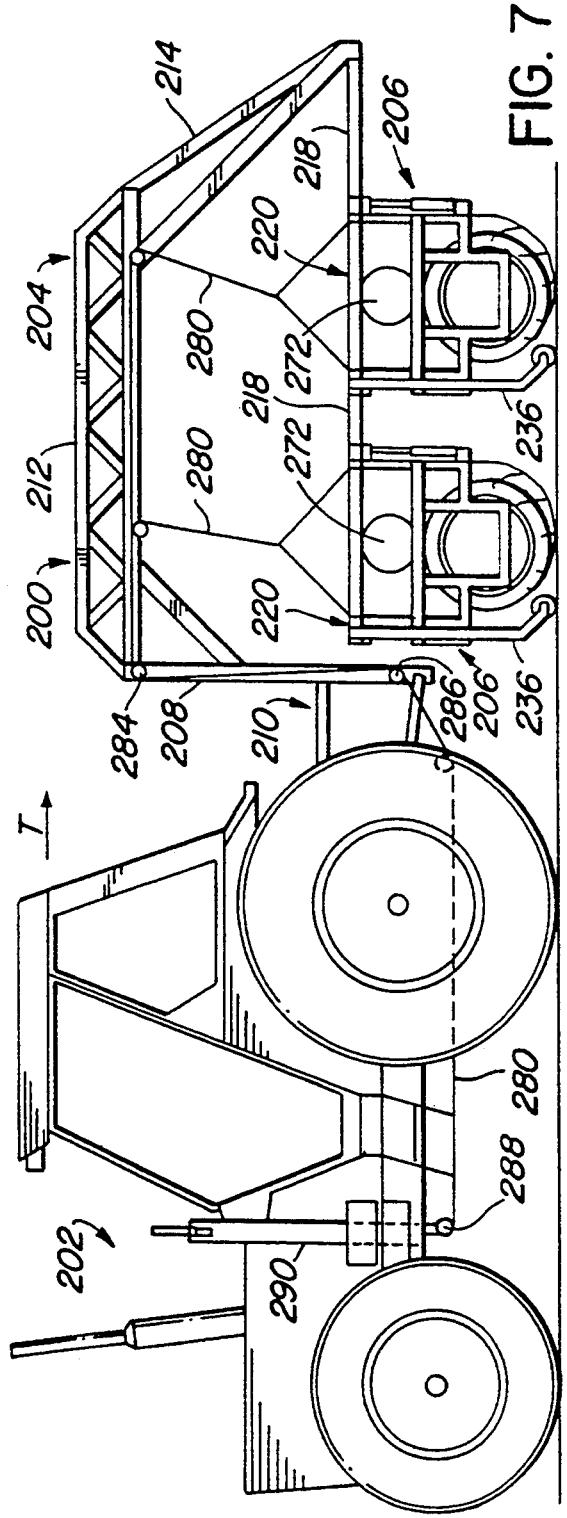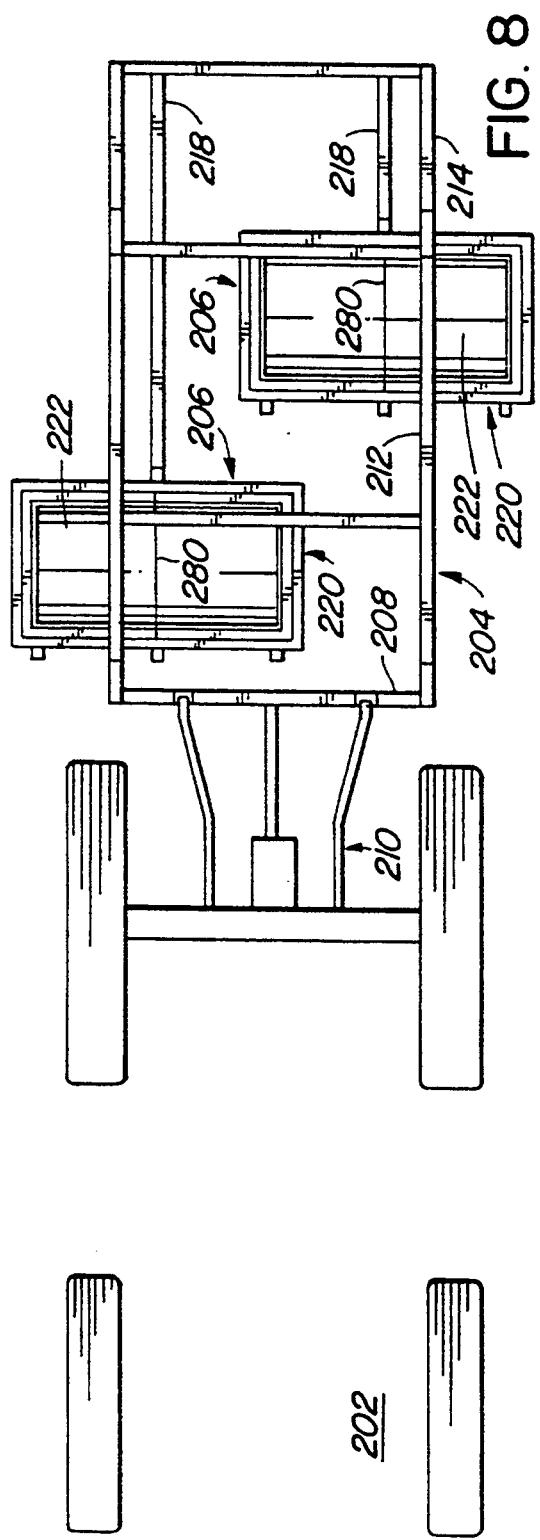

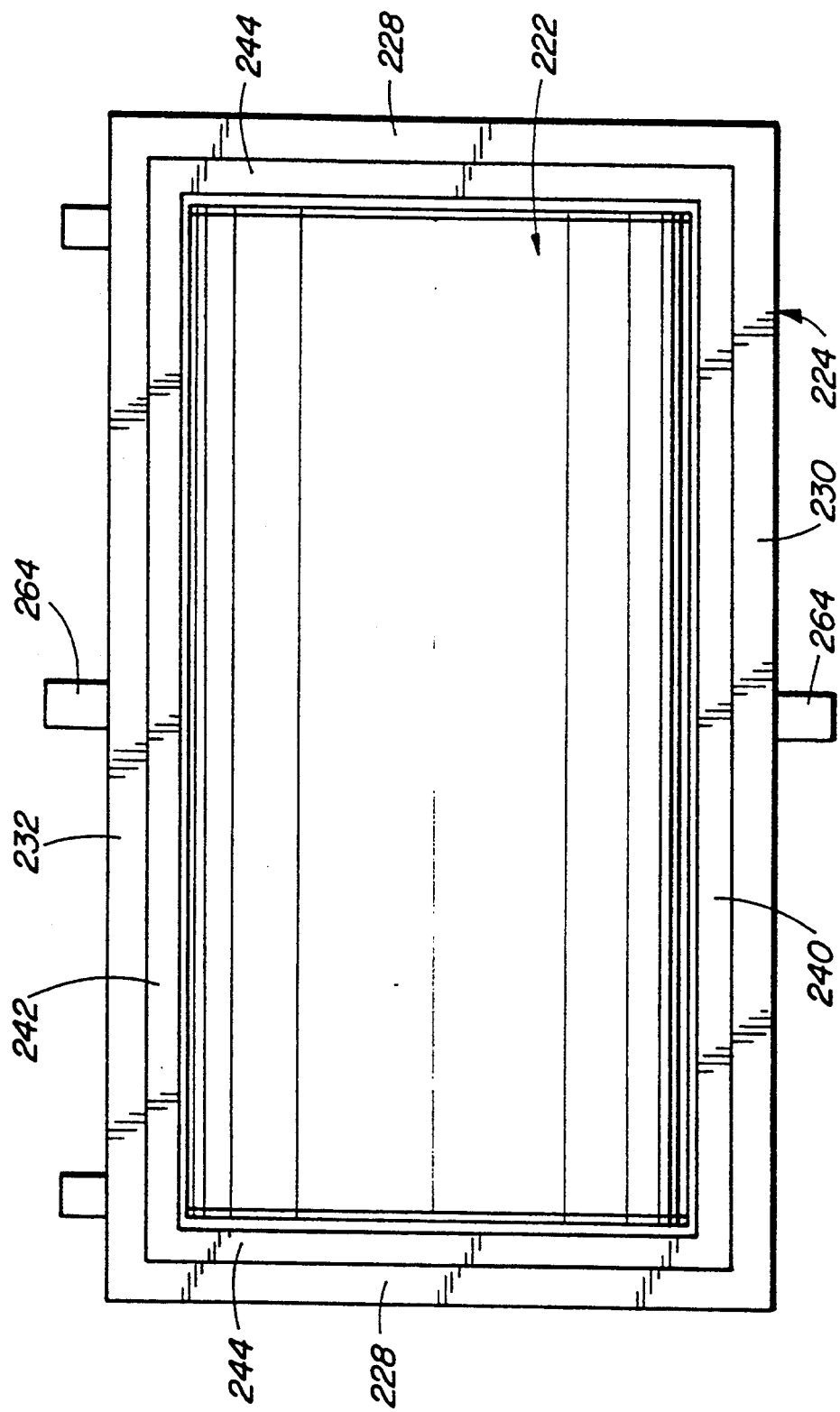

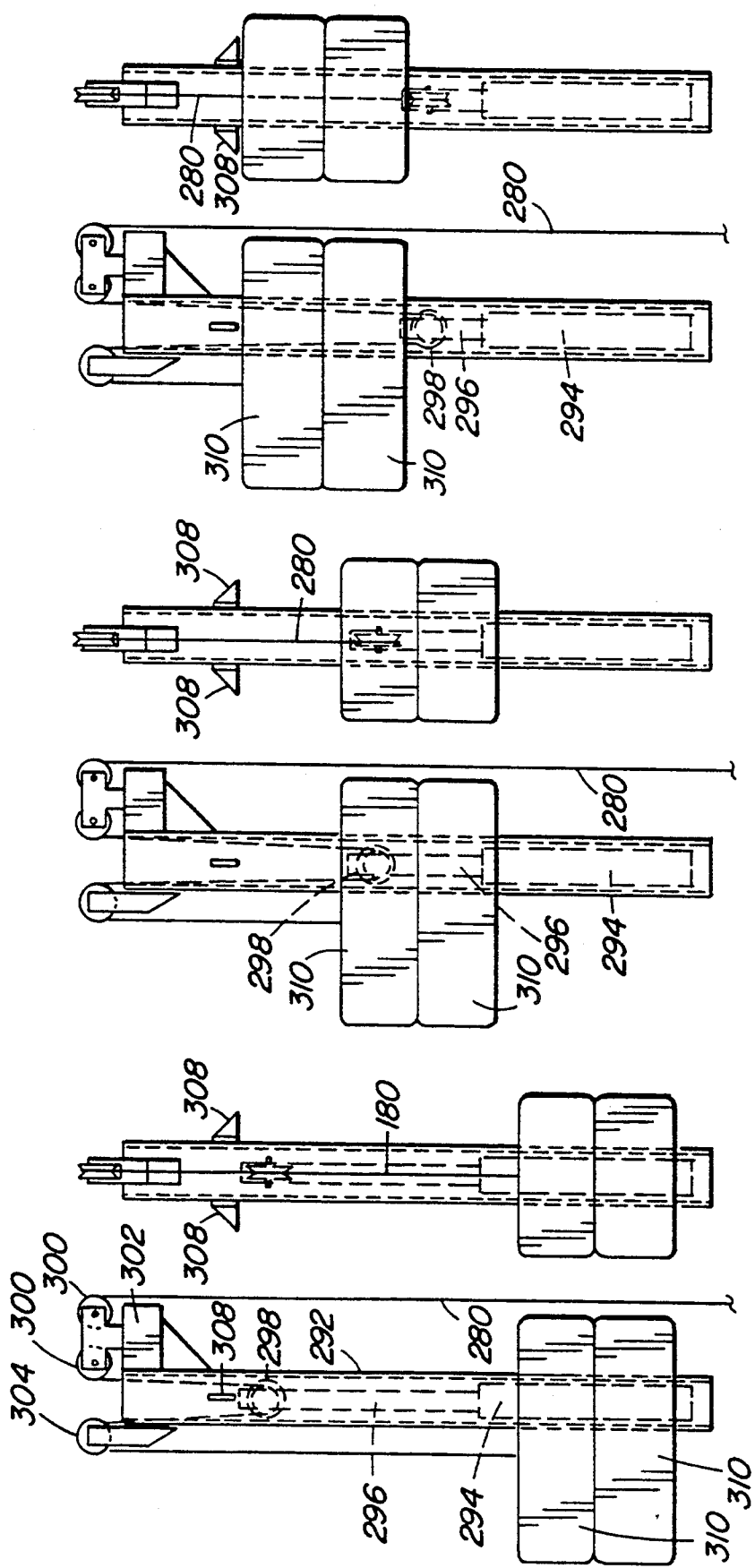

LOWBUSH BERRY HARVESTER

The present invention relates to a berry harvester in general and, in particular, to a harvester for lowbush berries such as strawberries or wild blueberries.

BACKGROUND OF THE INVENTION

There have been many attempts in the past to devise a mechanical harvester for the picking of lowbush blueberries, particularly in the maritime provinces of Canada where there are extensive fields of the crop to be picked each year. The typical manner of blueberry picking has involved the use of a hand tool wielded by an individual picker, the tool being like a combination comb and scoop, which is moved through the berries to scrape them from the bushes and collect them in a funnel-like portion of the tool. This is back-breaking work.

Mechanical harvesters date back to the late 1960's, having been developed by individual berry farmers or by companies that see the business as a profitable one. For example, an early harvester is shown in Canadian Patent No. 961,275 of The Chisholm-Ryder Company. This harvester used a cylindrical reel having a plurality of tines spaced apart along an elongated rod, there being a plurality of such rods circumferentially spaced about the reel. The tines, as the reel rotated, were combed through the bushes so as to pull the berries therefrom and then they carried the berries upwardly until they fell therefrom into the centre of the reel. The falling berries encountered a conveyor running axially within the reel, which conveyor carried the berries laterally to another conveyor running to the rear of the harvester, from which they were deposited into a flat or other container. The Chisholm-Ryder harvester was mounted to the front of a small garden tractor and was pushed thereby through the berries. While it did work it was not particularly efficient and it did not operate satisfactorily on uneven ground.

A later development is reported in Canadian Pat. No. 1,249,727 of Bragg Lumber Company. According to the patent, this harvester mounts a picking head, almost identical to the Chisholm-Ryder head, on the side of a farm tractor, but in such a manner that the picking head is "towed " by the tractor. The arrangement ostensibly accommodates variations in the ground by allowing for pitch and roll of the head during operation. As with the Chisholm-Ryder head, the tines of the Bragg harvester are controlled by a cam and cam follower arrangement. In the Bragg harvester, as the tines approach top dead centre of the reel they are caused to flap rapidly to dislodge the berries carried thereby for easy deposit on the internal conveyor. While this harvester is an improvement over the Chisholm-Ryder harvester it still has its shortcomings. In particular, it is necessary to harvest a field in one direction only so that the tractor does not travel over bushes from which berries have not already been stripped. Otherwise the tractor wheels will crush berries in its path. In fact, the first pass of the harvester through a field will result in some loss due to crushing by the tractor wheels, unless a path is cleared first of all by manual harvesting. Only after that first pass can the tractor be driven in the proper direction to minimize loss. Also, the harvested path is limited to the width of the picking head, typically 3 to 4 feet. Many passes are required to harvest a large field. Furthermore, according to the patent, the weight of the picking head is supported only by a pair of skids mounted to the ends of the picking head. This weight is substantial and although there is the ability for the picking head to pitch and roll on uneven ground the weight thereof will tend to make the supporting skids dig into soft ground.

SUMMARY OF THE INVENTION

The present invention overcomes problems associated with the aforementioned harvesters, resulting in a harvester that is more efficient and which causes less damage to the blueberry crop than the prior harvesters. The present harvester uses a picking head that is based on the Chisholm-Ryder head, with a few modifications thereto that result in improved efficiency. The present invention uses a tractor which is modified to run in reverse with a pair of picking heads mounted to the tractor via its three-point hitch. The picking heads are offset longitudinally and laterally and operate in advance of the tractor as it moves through the field. Each head has an internal lateral conveyor which receives berries from the picking reel within the picking head and the berries are conveyed to the respective side of the tractor and then to a rearwardly elevating conveyor that takes the berries to a platform mounted at the side of the tractor where they are deposited in flats or other containers. A counterbalance system reduces the effective weight of the picking heads acting on the ground and makes it easier to clear obstacles and to raise the heads for turning or road travel.

Generally speaking, therefore, the present invention may be considered as providing a harvester for lowbush berries comprising: (a) a pair of independent picking heads offset longitudinally and laterally relative to a direction of travel, each picking head including frame means, a line-carrying harvester reel rotatably mounted in the frame means, and means supporting the frame means above the ground; (b) a truss section to which the picking heads are mounted, the truss section being pivotally connectable to the three-point hitch of a tractor; (c) tongue means pivotally connected to a forward portion of the truss section and connected to a respective trailing picking head; (d) first conveyor means extending laterally from within each of the harvester reels to remove from the reel berries deposited therein; (e) second conveyor means extending rearwardly from each first conveyor means to respective berry collection stations mounted on the tractor; and (0 counterbalance means mounted on the tractor for automatically reducing the weight of the pie-king heads acting on the ground and for elevating the picking heads as desired.

BRIEF DESCRIPTION OF THE DRAWINGS

FIG. 7 is an elevational view of a second embodiment of the berry harvester of this invention.

FIG. 8 is a partial plan view of the harvester of FIG. 7.

FIG. 9 is a partial plan view of the picking head of the second embodiment.

FIGS. 16A to 16F show the component of FIG. 14 in various positions depending on the operation thereof.

DESCRIPTION OF THE PREFERRED EMBODIMENT

Figure 1:
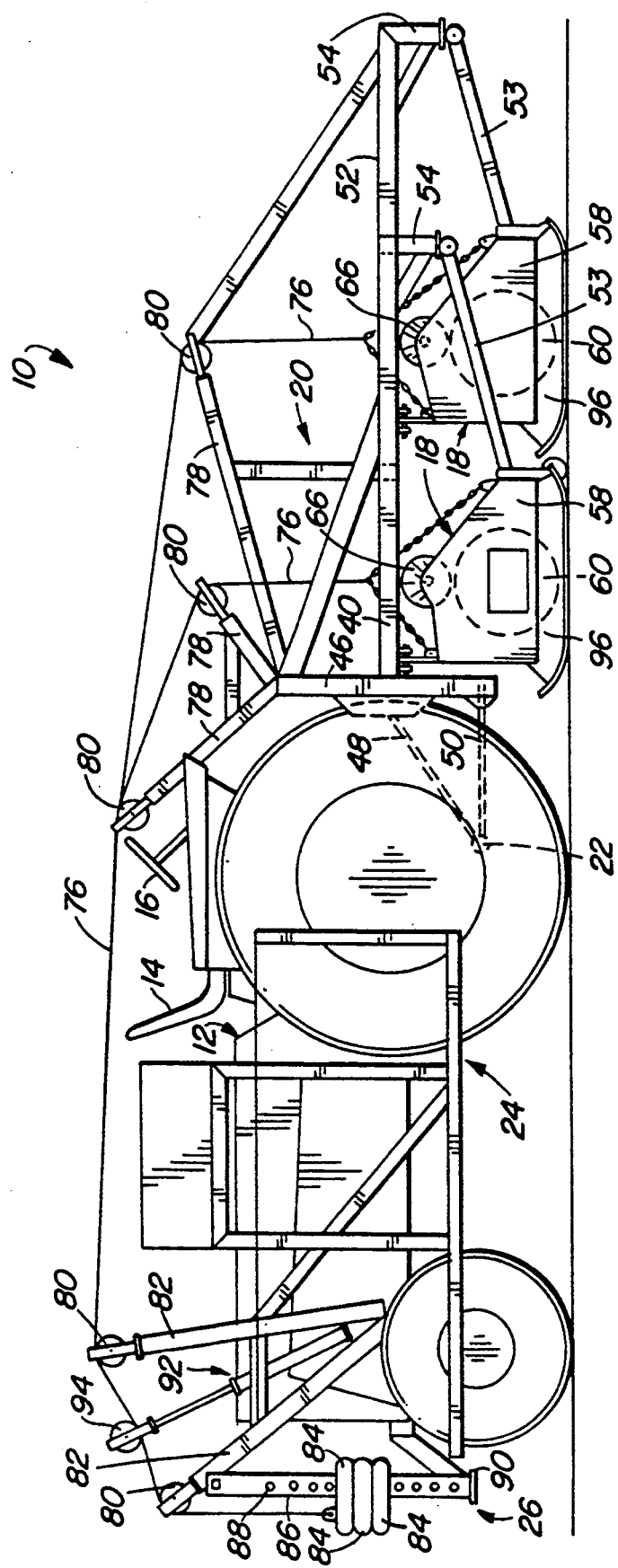
FIG. 1 is an elevational view of a first embodiment of the harvester of this invention.
Figure 2:
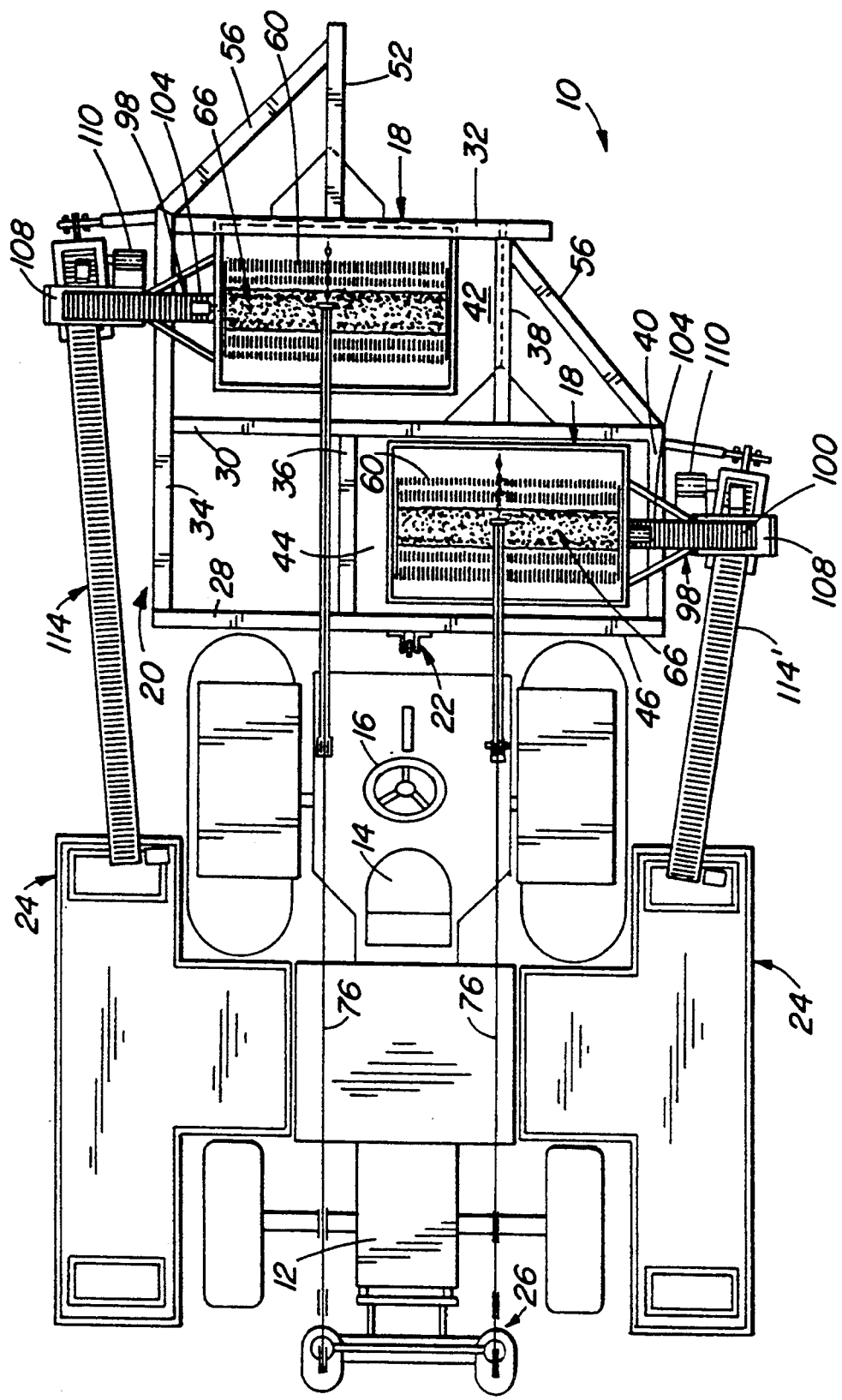
FIG. 2 is a plan view of the harvester of FIG. 1.

FIGS. 1 and 2 illustrate a first embodiment of the lowbush berry harvester 10 of the present invention as being mounted to a typical farm tractor 12 which has been modified to run in reverse. The modifications are well within the purview of any skilled mechanic and involve rotating the seat 14, steering wheel 16 and the various controls so that the operator faces the "rear" of the tractor during use. For the present discussion the direction of travel will be from left to right in FIGS. 1 and 2 and the "front" of the tractor and the harvester will be at the right hand end of those figures. The invention will also operate with recently-introduced tractors that come from the manufacturer configured for normal operation in either a forward or a rearward direction.

The harvester 10 involves a pair of picking heads 18 mounted within and carded by a truss section 20. The truss section 20, in turn, is connected to the three-point hitch 22 of the tractor so that the truss section is pushed by the tractor as it proceeds in the direction of travel. The tractor also carries a platform 24 on each side thereof, the platform being used for the packaging of the berries after they have been harvested from the bushes. A counterbalance means 26 is provided at the end of the tractor opposite the truss section 20, the counterbalance means being used to reduce the weight of the picking heads acting on the ground and to raise or lower tile picking heads for on-road travel, turning, or to avoid obstructions in the path of the harvester. These various components will be described in greater detail hereinafter.

With reference to FIG. 2 it will be seen that tile truss section 20 includes laterally and longitudinally extending frame members 28, 30, 32, 34, 36, 38, and 40 which together define longitudinally and laterally offset rectangular areas 42 and 44. A vertical rectangular frame 46 is provided at the rear of the truss section and is connected to the tractor's three-point hitch 22 by connecting members 48, 50 in a conventional manner. Centrally of the offset area 42 is a forwardly extending arm member 52 having a depending leg member 54 at the free forward end thereof, the arm member 52 being braced by angled reinforcing member 56. A depending leg member 54 is also provided at the forward end of longitudinal frame member 38, there being another angled reinforcing member 56 extending from the end of lateral frame member 30 to the forward end of the frame member 38. The frame member 38 performs the same function as the arm member 52 and for the purposes of this discussion may be considered as being an arm member. A tongue member 53 is pivotally connected to and extends rearwardly from the leg member for pivotal connection to the trailing picking head 18 so that the head is capable of roll and pitch movements to accommodate irregularities in the contours of the ground.

Contained within each area 42, 44 is a picking head 18, it being seen from FIG. 2 that the two picking heads are laterally and longitudinally offset from each other, although there is a slight amount of lateral overlap to ensure that all bushes in the path of the harvester 10 are harvested. Typically, a harvester such as the Bragg machine, previously described, can harvest a swath of three or four feet in width, depending on the width of the picking head. With two four foot wide picking heads the present invention can harvest a swath of seven to eight feet in width, a substantial increase over the prior patented harvesters. The picking heads 18 are substantially identical, the only difference being in the direction in which the harvested berries exit the picking head. Hence only one head will be described.

Figure 3:
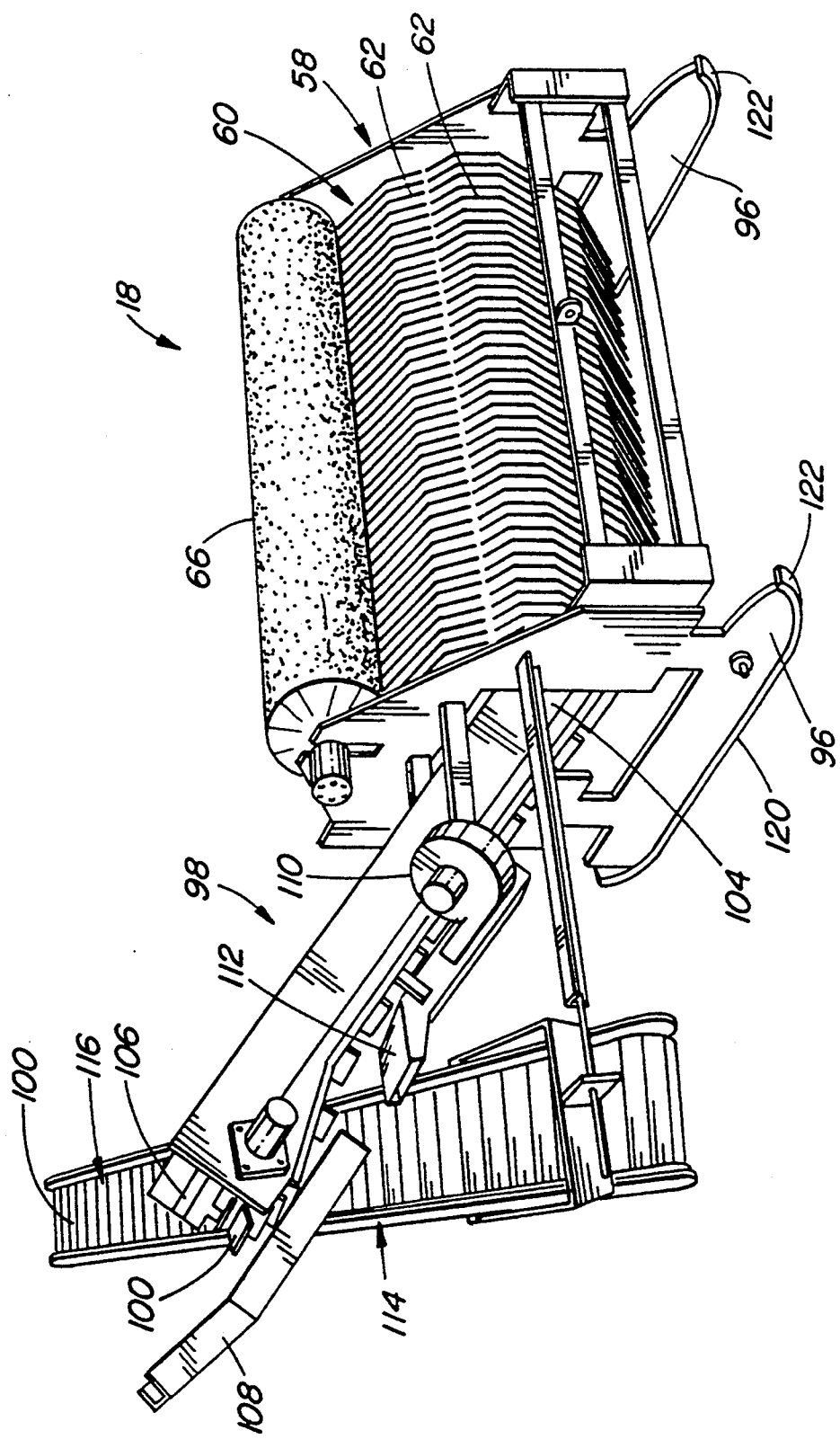
FIG. 3 is a perspective view of one picking head and the conveyors associated therewith.
Figures 5, 6:
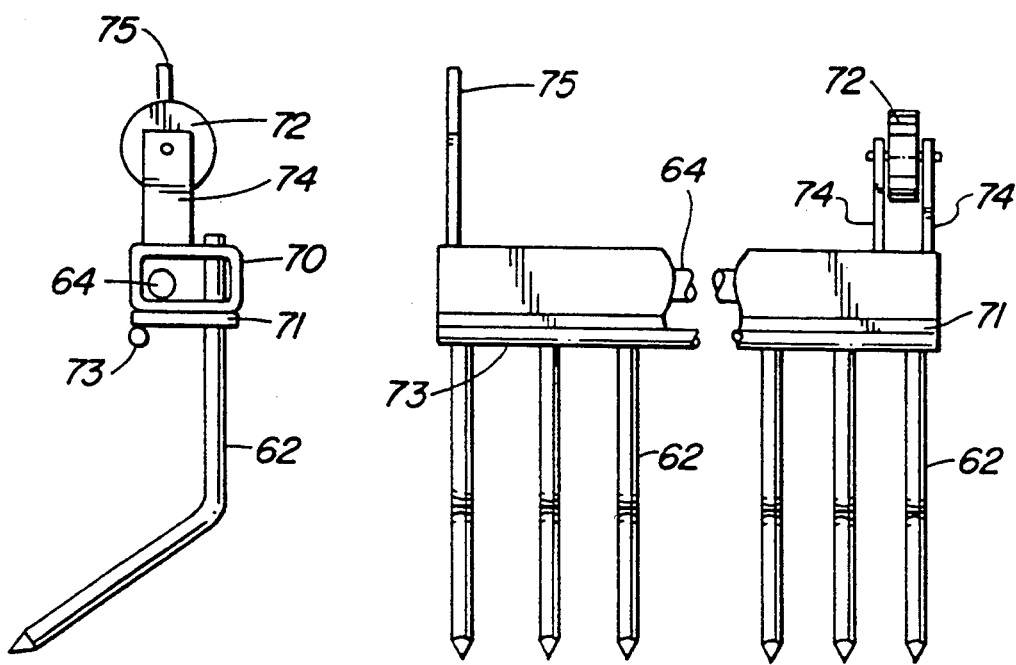
FIG. 5 is an end view of a berry picking tine and its mounting arrangement.
FIG. 6 is a partial elevation of the tine mounting arrangement.
Figure 10:
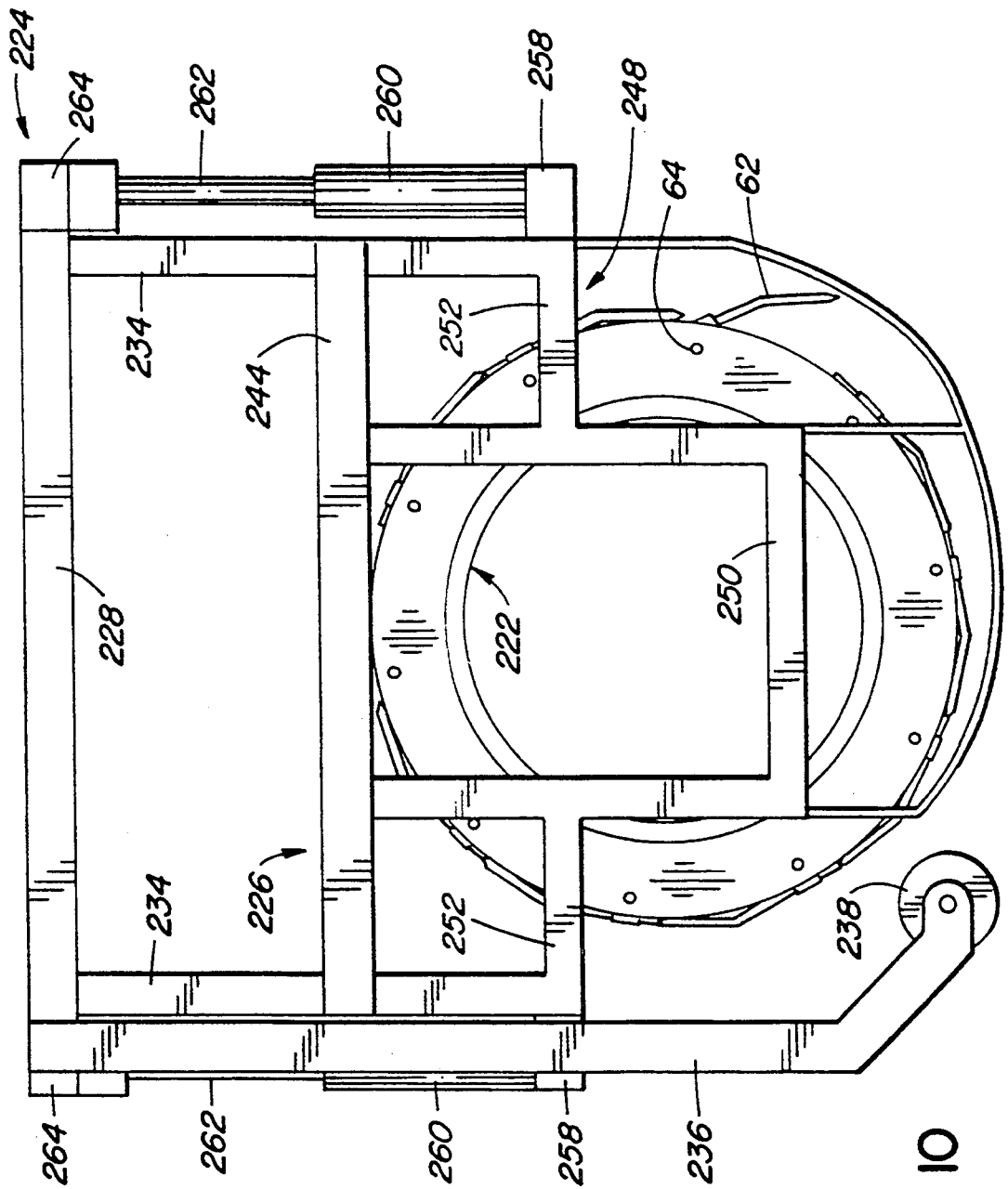
FIGS. 10 and 11 are end and front views respectively of the picking head of FIG. 9.

FIG. 3 is a perspective view of the exterior of a picking head 18, along with certain conveyors associated therewith. The picking head 18 includes a surrounding frame 58 and a reel 60 bearingly supported within the frame for rotation about an axis which is transverse to the direction of harvester travel. The reel 60, as in the Chisholm-Ryder and Bragg picking heads, includes a plurality of laterally spaced apart picking tines 62 mounted to a pivotable transverse rod 64 (FIGS. 5 and 6). A rotating brush 66 is mounted in the frame 58 above the reel 60 so as to engage the tines 62 at the top of their travel, the brush removing debris from the tines and also dislodging therefrom berries that did not fall from the tines of their own accord, as will be described below.

The manner in which the reel 60 is mounted in the frame 58 and the drive therefor will not be specifically described herein as there is no substantial difference between the present arrangement and that of the prior art. There are however some detail changes over the prior art which improve the operation of the present harvester. These changes will be discussed with reference to FIGS. 4 to 6.

Figure 4:
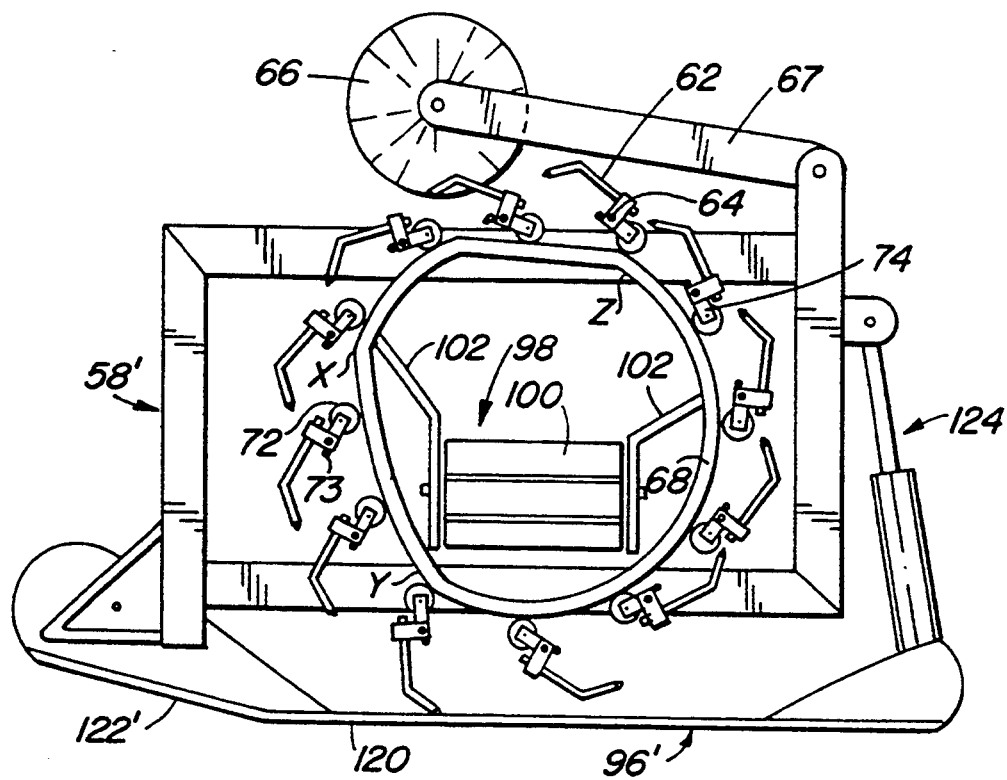
FIG. 4 is an end view of a portion of a another picking head and reel assembly that may be used with the present invention.

FIG. 4 shows an end view of a picking head and reel with a simplified frame 58', without showing the reel per se. This picking head operates the same as the picking head 18 and can be used in place thereof. The frame mounts a fixed cam at one end thereof, the cam having a profile that causes the tines to move in a particular fashion as the reel rotates. As seen in FIGS. 5 and 6 a box member 70 surrounds and is welded to the transverse rod 64. Each tine 62 passes through the box member 70 adjacent the rod 64 and is welded to the box member. A flat reinforcing bar 71 is also welded to the underside of the box member 70 for added strength and to prevent loosening of the tines. The tines 62 are farther apart than in the prior art harvesters to ensure that the highest number of collected berries will actually be harvested while avoiding binding or jamming of the tines in the bushes. The tines of the present invention are also longer than the prior art tines and they are made from a spring steel rather than a mild steel so that there will be less bending or breakage of the tines when they encounter an obstacle.

At one end of the box member 70 is a roller member 72 mounted within lugs 74. When the tine arrangement is mounted on the reel each roller member 72 will contact the cam 68 and act as a cam follower with respect thereto. A control bar 75 at the opposite end of the reel limits rotation of the rod 64 so that the roller 72 is kept in contact with the cam 68, gravity and the weight of the tines helping to maintain roller-cam contact as the reel rotates. It is not necessary to spring load the line assembly to maintain contact between the roller and the cam.

An elongated bar or rod 73 welded to the bar 71 at its outer edge acts as a berry shelf to help retain harvested berries against the bar 71 as the tines move upwardly on the reel towards their dumping position.

With reference to FIG. 4, and assuming a counter-clockwise rotation of the reel, it will be seen that the cam 68 is formed so that the tines 62 have a generally vertical orientation as they descend from the point X towards the point Y. This prepares the tines for a generally vertical entrance into the plants to be harvested. At the point Y the cam takes on a circular configuration, which causes the tines to take initially a generally horizontal orientation as they pass through the plants and strip the berries therefrom, the berries resting on tile tines and being pushed towards the bar 71. The circular form of the cam continues to almost 1 o'clock and as the tines pass through the vertical they start to dump berries into the central part of the reel so that they fall towards the conveyor 98. After the point Z the cam flattens somewhat to turn the tines more towards the vertical so that they Will contact and enter the rotating brush for cleaning and debris removal. After passing through the brush 66 the tines start their descent again and tile process continues.

The counterbalance means 26 will now be described, with particular reference to FIGS. 1 and 2. For each picking head there is a tension means 76 in the form of a wire, cable, rope or chain which extends from the picking head to the opposite end of the harvester. The tension means 76 passes over forward compression members 78 fixed to the vertical frame 46 of the truss section, each compression member being surmounted by a rotatable pulley 80 which carries the tension member. Additional compression members 82 are provided at the opposite end of the tractor and each is surmounted by a pulley 80 to carry the tension member 76. The tension member, after passing over the last compression member in the chain is connected to a counterweight 84 which is vertically slidable on a guide pole 86 between upper and lower limits 88, 90 respectively established on the pole 86. A single counterweight member can be used, or as illustrated, a plurality of counterweights can be provided on the pole 86. By using a plurality of counterweights the operator has less weight to handle in the event that he has to remove and/or replace individual counterweights.

Operation of the counterbalance means 26 is achieved through an adjustable tension member 92 positioned between the compression support members 82, the member 92 also being surmounted by a pulley 94. Preferably the member 92 is constructed as a double-acting hydraulic cylinder with the cylinder portion being attached to the tractor and the rod portion extending upwardly towards the tension member 26 and carrying the pulley 94. In this case, however, the tension member 76 passes under the pulley 94 so that as the adjustable tension member 92 is retracted or extended the tension member 76 is pulled inwardly or released outwardly between the pulleys 80 on the compression members 82. This has the effect of simultaneously raising or lowering the counterweight 84 and the picking head 18 at the forward end of the harvester.

If there is a need to elevate the picking head, as for example so that the harvester can be turned or so that the head can be raised to avoid an obstacle, the operator actuates the adjustable tension member 92 to retract the rod portion thereof. As mentioned above, this pulls the tension member or cable 76 downwardly between the rearward compression supports 82 and raises both the counterweights 84 and the picking head. As the cable is pulled further downwardly the counterweights will rise to the upper limit 88 and will be prevented from any further upwards movement. Since the cable is still being pulled, the pulling movement is transferred wholly to the picking head which raises rapidly relative to the tractor, high enough to clear any obstacle in its path or just high enough to allow easy turning movement of the harvester. Once the necessity for raising the picking head has passed, the adjustable tension member 92 is operated in the opposite direction to lower the picking head by itself and then the picking head and the counterweights together.

It will be appreciated that the picking head of the harvester is very heavy and that its weight can be damaging to the bushes over which it travels and can make it difficult for the head to travel smoothly over uneven ground. The counterbalance system described above alleviates the effect of the picking head 'weight in that by suitably operating the adjustable tension member 92 the operator can relieve the weight of the picking head by up to about 75%. When tile counterweights are resting at the lower limit 90, with the tension member 76 fully relaxed, the full weight of the picking head will be acting on the ground through a rear mounted support roller (not shown) and through any wheels helping to support the head. As the counterweights are lifted from the lower limit through actuation of the adjustable tension member 92 the counterweights will counterbalance the weight of the picking head and the effective weight of the picking head on the ground will be reduced, to the point where only about 25% of the weight of the picking head is bearing on the ground. This is a distinct advantage over the prior art harvesters, both from the standpoint of reducing damage to the berry bushes and of reducing damage to the picking head and improving the ease of turning the harvester when necessary.

As seen in FIGS. 1 and 2 each of the picking heads is provided with its own independent counterbalance system 26, whereby each picking head can be independently controlled by the operator such that one head can be raised to clear a rock or other obstacle while the other head continues to harvest berries in its path.

The berry collecting aspects of tile invention are best seen in FIGS. 2 and 3 and comprise a laterally extending conveyor 98 housed within each reel 60 adapted, as is the Chisholm-Ryder conveyor, to receive berries that have been picked by tile tines 62, carried to the top of the reel thereby and then released to fall into the reel so o as to land on the conveyor 98. The conveyor is mounted in a conventional manner as low as possible within tile reel in order to ensure maximum capture of berries. The conveyor is similar to the Chisholm-Ryder or Bragg conveyors except that there is a flight 100 for each section of the conveyor, the flights being positioned at about 2 inch intervals. Deflector panels 102 funnel the falling berries onto the conveyor 98 so that they can be transported laterally out of the reel.

At the outer end of the reel the conveyor 98 angles upwardly and laterally as at 104. At the upper end thereof and below the discharge portion 106 is a plastic or sheet metal pan 108 which spreads and redirects the berries, as well as debris such as leaves, stems, et cetera, backwards and downwards towards the reel 60. A blower 110 mounted to the framework that supports the angled portion of the conveyor directs high speed air through a flat nozzle 112 back towards the exit end of the pan 108, the air exiting the nozzle serving to blow the debris away, while allowing the picked berries to fall down to a second conveyor 114.

The conveyor 114 is similar to the conveyor 98, having a wide, sectioned belt 116 with flights 100 thereon about every 2 inches. The Conveyor 114 angles upwardly and rearwardly relative to the direction of travel and the berries drop off the upper discharge end into a flat positioned appropriately by an operator. The operator stands on a large platform 24 cantilevered at the side of the tractor, the platform being strong enough to support tile weight of tile operator and the accumulated berries as they are harvested. As seen in FIG. 2 the conveyor 114 on one side of the tractor will be longer than the conveyor 114' on the other side of the tractor due to the longitudinal offset of the picking heads 18.

The cylindrical brush 66 is mounted above the picking head in a conventional manner, as on a cantilever arm 67 (FIG. 4), so as to interact with the tines 62 when they are at to top of the reel. The brush 66 forces debris from between the tines and also promotes the discharge of berries from the tines into the reel. The brush will move much of the debris away from the reel itself but it will also cause some debris to enter the reel, which debris will be removed from the harvested berries by the blower system previously described. The brush 66 rotates in a direction opposite to that of the reel 60 so that the brush and tines are moving in the same direction at their zone of contact at the top of the reel. The brush preferably has a higher rotational speed than the reel to provide the necessary cleaning forces.

Skids 96 or 96' provided at each end of a picking head can help to support the head above the ground and are intended to prevent the tines from digging into the ground if the harvester encounters a hummock or a sharp depression in the ground. Each skid is designed to have a long generally flat running surface 120 while a sharply curved 122 or angled 122' forward section helps the skid to ride over obstacles. An hydraulic cylinder 124 at the rear of the skid, mounted as well to the picking head frame 58 or 58' is used to adjust the height of the reel above the ground. Needless to say, the skid 96,96' is mounted to the frame 58,58' at only a single point to allow for the pivotal adjustment movement controlled by the cylinder 124.

All components of the harvester of this invention are operated hydraulically in a conventional manner. Thus the reels, conveyors, blowers and counterbalance systems are powered by the tractor'hydraulic system or by an independent system connected to the tractor'power take-off. The tractor operator will have appropriate controls to ensure that he can control the operation of each component on an individual basis in order to ensure safe and efficient harvesting of the berry crop.

A second embodiment of this invention is shown in FIGS. 8 et seq. The harvester 200 is again adapted to be pushed by a tractor 202 operating in reverse, as in the first embodiment, the direction of travel being shown by the arrow "T". This embodiment uses a truss section 204 connected to the tractor'three point hitch as in the first embodiment, with picking heads 206 also being mounted to the truss section 204 in a floating manner. The picking heads 206 are situated so that they are offset one from the other both laterally and longitudinally of the direction of travel.

In this embodiment the truss section 204 includes a vertically oriented frame portion 208, connected to the tractor via the three-point hitch 210. At the top of the frame 208 there is a second cantilevered frame portion 212 projecting in the direction of travel and overlying the picking head locations. A forward frame portion 214 slopes downwardly and forwardly from the forward end of the cantilevered frame portion 212. The frame portions 208, 212 and 214 are conventional in construction, having suitable reinforcements to ensure rigidity.

Extending rearwardly from the forwardmost member 216 of the frame portion 214 is a pair of tongue members 218, each being pivotally connected to the frame member 216 in a conventional manner. One of the tongue members is shorter than the other, connecting the frame member 216 to the forwardmost one of the picking heads 206, while the other, longer tongue member connects the frame member 216 to the rearwardmost picking head 206, as best seen in FIG. 8. Each tongue member is fixedly connected in a conventional manner to a frame 220 which surrounds the associated picking head 206.

Turning now to FIGS. 9 to 14 the revised picking head for this embodiment will now be described, bearing in mind that it operates in the same manner as the picking head of the first embodiment and that the picking heads of the two embodiments are generally interchangeable, with very little modification to the mounting system therefor being required. The revised picking head is the subject of a copending, commonly assigned, concurrently filed patent application.

As with the first embodiment the picking head of the second embodiment includes a frame portion 220 and a picking or harvesting reel 222. There is an internal conveyor for the reel 222 adapted to convey harvested berries to a second conveyor, all as in the first embodiment, and, because there are no essential differences between the conveyor arrangements of the two embodiments, the conveyors have been omitted from the drawings of the second embodiment for the sake of clarity.

The frame 220 includes two distinct portions, namely an upper, outer portion 224 and a lower inner portion 226 which is movable vertically relative to the upper portion 224. The upper frame portion 224 is rectangular in outline, with side members 228, front member 230 and rear member 232 welded together as in FIG. 9. Extending downwardly from each of the frame members 230 and 232 is a pair of hollow rectangular tube members 234. A pair of vertical-members 236 extends downwardly from the rear frame member 232 adjacent the ends thereof and mount between them at the lower ends thereof a transversely extending roller 238 which spans the width of the reel 222 and supports the frame portion 228 on the ground.

The lower frame portion 226 is also rectangular in outline, having front and rear frame members 240, 242 and end members 244. The lower frame portion is slightly narrower and shorter than the upper frame portion 224. A pair of stub members 246 is welded to each of the front and rear frame members 240, 242 in alignment with, and for sliding reception in, corresponding tube members 234.

Figure 11:
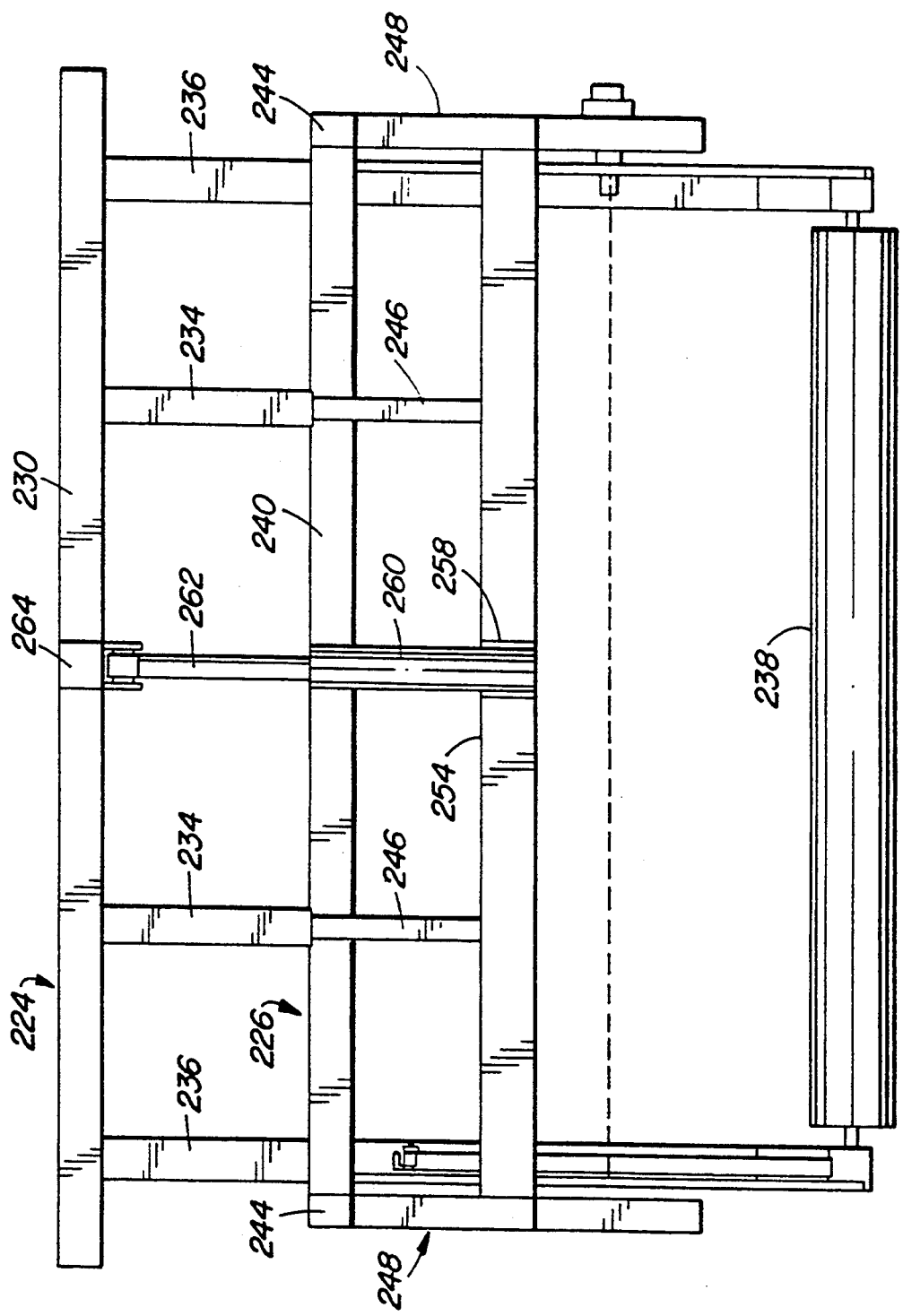

An end frame section 248 is provided below each of the end frame members 244, each end frame section 248 being provided with suitable bearing members and mounting hardware to mount the reel and the lateral conveyor, as in the first embodiment and the prior art. The frame section 248 includes a central U-shaped member 250 and laterally extending intermediate L-shaped members 252, each of which is also welded to the end frame member 244. A lateral frame member 254 extends across the lower frame portion 226 between the elbows of both the front and rear L-shaped members 252 as best seen in FIG. 11. Vertical strengthening members 256 extend from each frame member 254 to the front and rear frame members 240, 242 respectively below each of the stub members 246.

Centrally of each frame member 254 there is provided a stub member 258 to which is connected one end of a two-way hydraulic cylinder 260, the rod 262 of which is connected to a corresponding stub member 264 affixed to the front and rear frame members of the upper frame portion 224. The cylinders 260, when activated, will move the upper and lower frame members 224,226 towards or away from each other, suitably guided by the stub members 246 contained within the tube members 234. The stub member 264 on the front frame member 240 also acts as the connection point for the tongue member extending rearwardly from the truss section 204. The cylinders 260 are used to control the picking height and they help to keep the pitch angle of the tines constant with changes in the height of the picking head above the ground.

The pitch angle is the angle between a tine and a horizontal plane through the centre of the reel. With prior art harvesters, and with the first embodiment, the height of the reel is adjusted by a cylinder such as 124 (FIG. 6) which raises or lowers the rear of the reel frame relative to the front thereof. This has the effect of altering, albeit slightly, the pitch angle for each tine due to the pivoting nature of the height adjustment. With the second embodiment of the invention the entire reel and its mounting frame is raised or lowered by the same amount at the front and at the rear thereof so that there is no change in tile pitch angle of a tine during height adjustment. A change in pitch angle is believed to affect the harvesting performance of the reel and if there is no change in pitch angle with height adjustment it should be possible to maintain the tines at an optimum pitch angle at all times, no matter what the height 17 the reel above the ground might be.

The reel 222 is similar to the reel of the first embodiment and to that the Chisholm-Ryder harvester. However, the Present reel exhibits distinct differences in the manner in which the harvesting tines are controlled. Accordingly, the description is mainly concerned with that aspect of the invention, as best shown in FIGS. 12 and 13.

As with the first embodiment, there is a Plurality of tines 62 spaced apart along and mounted to a rod 64 that spans the width of the reel 222. With this embodiment there are Preferably ten rods evenly spaced circumferentially about the reel 222, rather than the twelve of the first embodiment. The number of tines, whether with the first or the second embodiment, is a substantial reduction from the number of tines of the Prior art. This reduces the number of tine Passes through a berry Plant for each rotation of the reel and avoids extensive damage to the Plants. The tines 62 are mounted to the rod 64 as in the first embodiment. At one end of the rod 64 there is an L-shaped bracket 266 welded to the box member 70, carrying a roller 268, the roller 268 being adapted to travel in a cam track 270 fixed to one end frame section 250. As the roller 266 travels in the track 270 it will cause the tines 62 connected to the rod 64 to follow a Predetermined path during rotation of the reel 222 This patch is shown in FIG. 13, wherein a single tine is followed as it moves with the reel 222.

Figure 12:
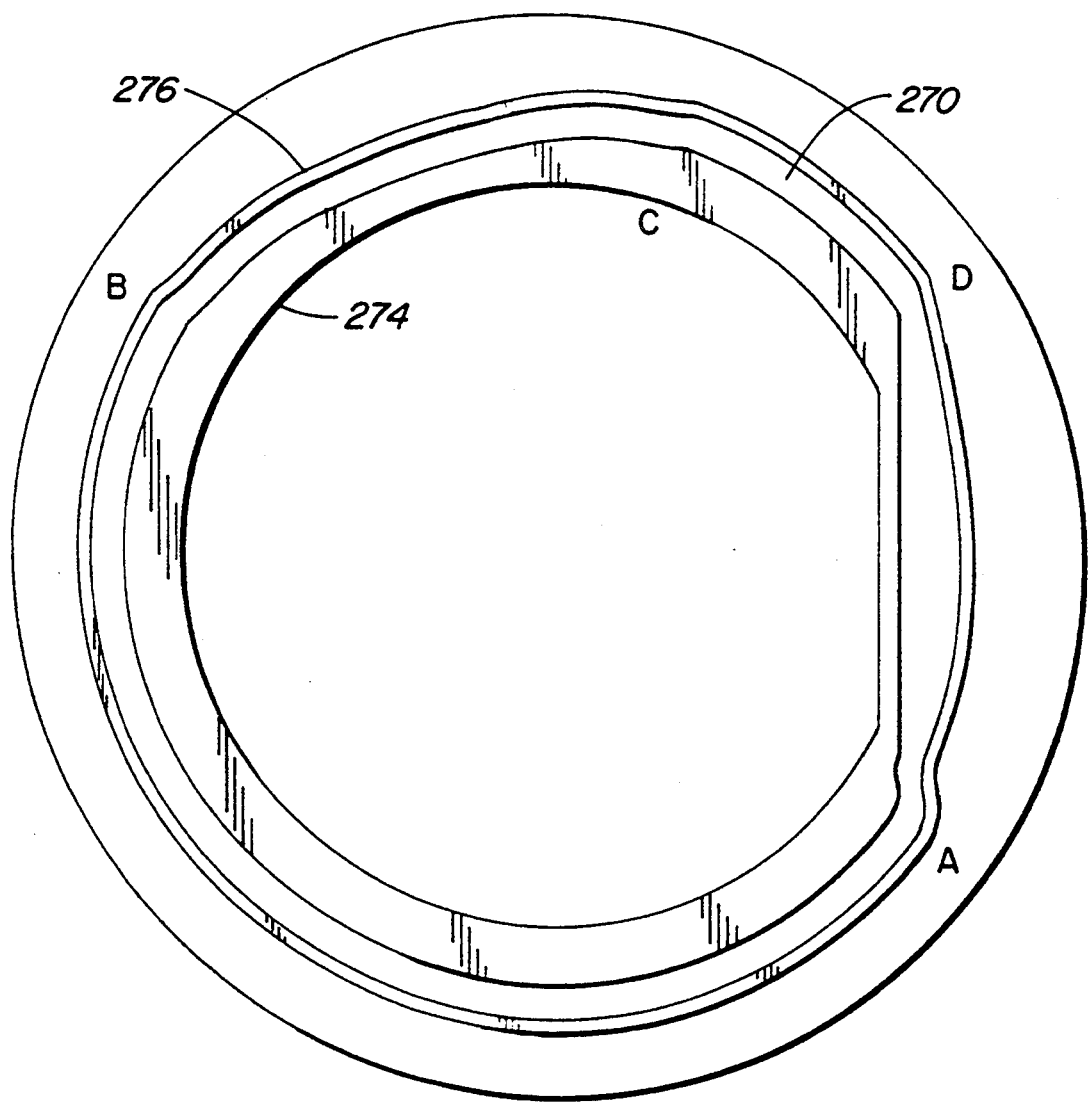
FIG. 12 is an end view of the cam arrangement for the tines of the second embodiment.
Figure 13:
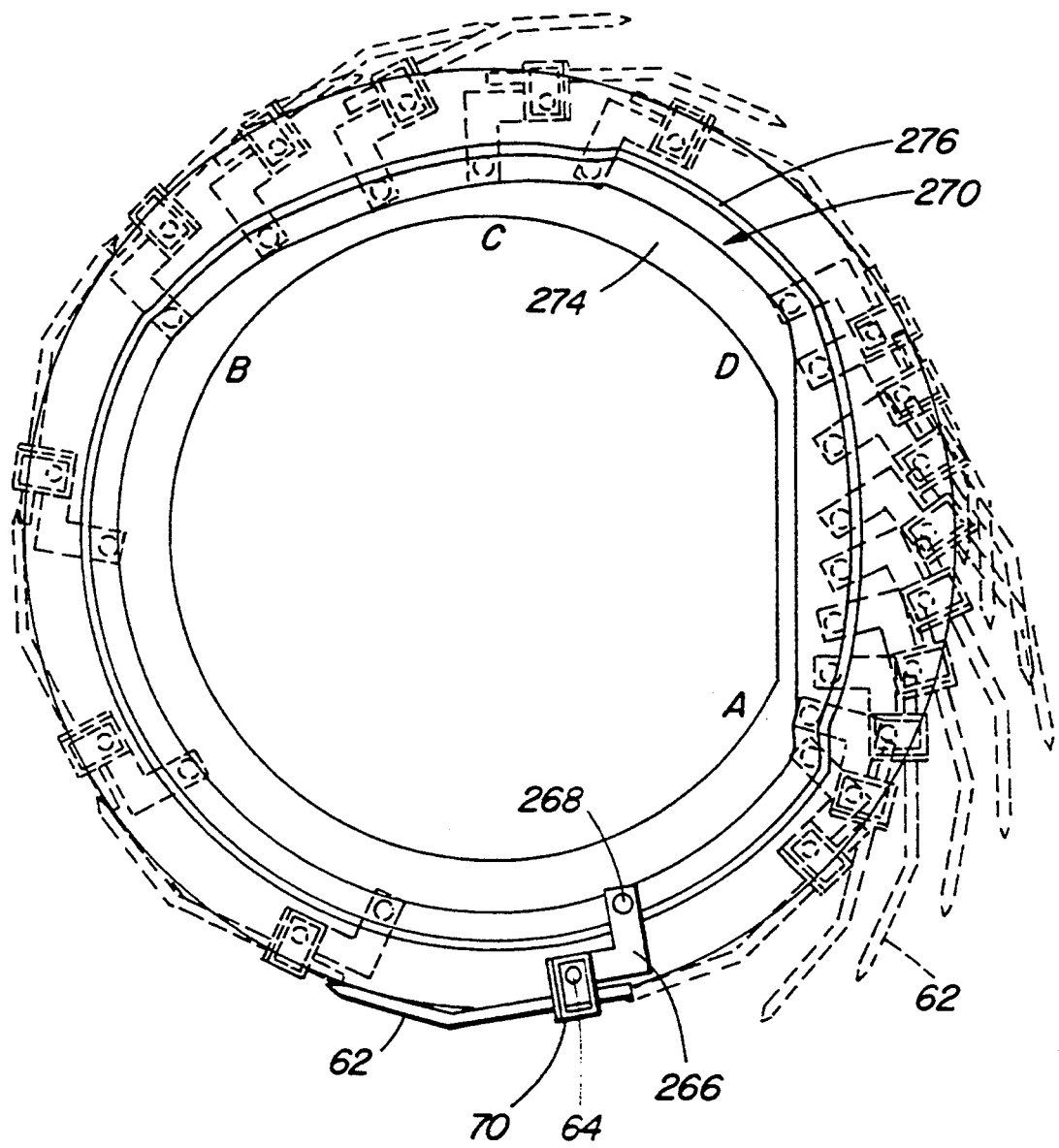
FIG. 13 is a view showing the orientation of a line as it moves around the arrangement of FIG. 12.

With reference to FIGS. 12 and 13 it will be seen that the cam track 270 has a lower and rearward generally circular Portion of about 180° between about 4 o'clock and about 10 o'clock as identified by the letters A and B. Between these positions as seen in FIG. 13 the tines 62 are closed relative to the reel so that they form an enclosed arc as they strip the berries from the plants at the bottom of the reel and cradle and hold the berries therebetween and against the box member 70 as the tines move upwardly, to the left in FIG. 13. With this system there is less loss of berries from the "back" of the tines as they elevate towards the top of the reel. After the point B at the upper rear thereof the cam track 270 deviates from its circular path, extending inwardly in stages towards the point C, almost in a direction tangential to the circular reel 222. This has the effect of progressively opening the tines upwardly between the points B and C so that they can be engaged by the cleaning brush 272, to be described later. Starting at about the point B the berries cradled by the tines begin to fall into the interior of the reel 222 for collection by the internal conveyor system as in the first embodiment and the prior art. Berries that are trapped in the tines will be dislodged by the brush 272, as will debris caught by the tines during harvesting movement.

An upper forward circular portion is provided between the points C and D, between about 1 o'clock and about 2 o'clock on the reel. The radius of this portion is about the same as for the portion A–B. After the point D the forward portion of the cam track exhibits another circular portion, of greater radius than the portion A–B but situated inwardly of the arc defined by that radius. This has the effect of again progressively opening the tines 62 outwardly so that as they approach the ground they are almost pointing vertically downwardly. This makes it easier for the tines to enter the berry plants without disturbing the plants themselves as the reel rotates and means that the tines will have a better chance of stripping all of the harvestable berries from the plants. Just before the point A the cam track 270 jogs back to its circular path at point A to quickly bring the tines back to an orientation lying along a circular arc.

As seen in FIG. 12 the cam track is preferably milled from a solid piece of metal such as steel, the track 270 being defined between inner and outer portions 274, 276 of the piece. Between the points D and A the gap between the inner and outer portions is increased to reduce weight. With the positive control provided by the cam track and the rollers captured within the cam track there is no requirement to provide any spring force, as in the prior an machines to ensure engagement between cam and follower.

Figure 14:
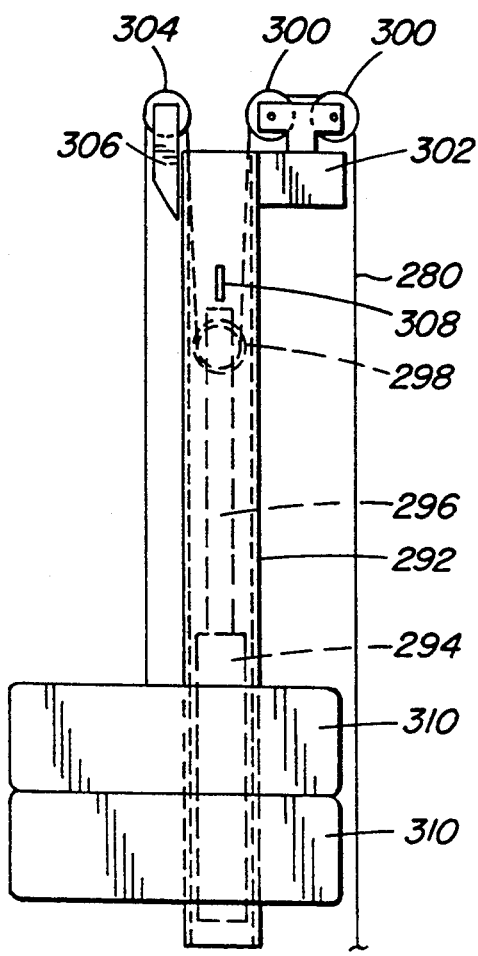
FIGS. 14 and 15 are side and end views of the operative component of the counterbalance means for this embodiment.

FIGS. 14 et seq. show a counterbalance system 278 which can be used with either the harvester of the first embodiment or the harvester of the second embodiment. It is illustrated in association with the harvester of the second embodiment.

The counterbalance system 278 of the invention includes tension members 280 in the form of a pair of cables or chains each connected centrally to a corresponding picking head 206 and extending upwardly to pass over a corresponding pulley 282 mounted in the truss section 206, and then extending forwardly to pass over another pulley 284 also mounted in the truss section. The tension members then pass downwardly to lower pulleys 286 and extend forwardly under the tractor 202 to a position forward of the cab of the tractor, as seen in FIG. 7. It will be appreciated that one of the tension members will extend along one side of the harvester and the tractor While the other tension member passes along the other side of the harvester and the tractor. From this point only one of the counterbalance systems will be described.

Figure 15:
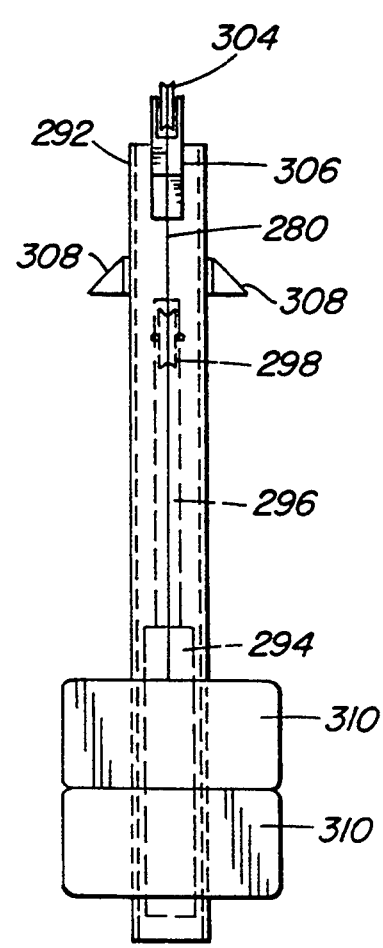

Forward of the cab, the tension member passes around another pulley 288 and extends vertically upwardly adjacent a counterweight member 290 mounted to the side of the tractor and shown in detail in FIGS. 14 and 15. The counterweight member 290 includes a hollow tube 292 having an hydraulic cylinder 294 mounted therein, with the bottom of the cylinder adjacent the bottom of the tube. The rod 196 projects upwardly within the tube 292 and has a pulley 298 rotatably secured to the upper end thereof. A pair of pulleys 300 is mounted on a first bracket 302 secured to the upper end of the tube 292 in the same plane as the portion of the tension member 280 extending vertically from the pulley 288. Another pulley 304 is mounted to a bracket 306 on the side of the tube 292 opposite and in line with the pulleys 300. Welded to the exterior of the tube 292 near the top thereof is a pair of opposed flanges 308 which will act as limits for the counterbalance system. A set, such as two, of heavy counterweights 310 is provided for vertical movement on and adjacent to the tube 292.

The operation of the counterbalance system is illustrated in FIGS. 16A through 16F, it being noted that the tension member 280 passes over the pulleys 300 then into the tube 292 and around the pulley 298, then upwards again to pass over the pulley 304, and then downwards for connection to the counterweights 310. In FIGS. 16A and 16B the counterweights are in their lowest position, with the rod 296 fully extended upwardly. In this position there is little or no tension on the tension member and the picking heads 206 will be at their lowest level relative to the truss section 204, with their full weight acting on the ground.

If the hydraulic cylinder 294 is activated to pull the rod 296 downwardly, as in FIGS. 16C and 16D, the effect will be to lift both the counterweights 310 and the picking heads 206 relative to the lowest positions thereof. This has the effect of relieving some of the weight of the picking heads, as in the first embodiment. Even though the picking heads may not come clear of the ground some, perhaps as much as 75%, of the weight thereof can be relieved.

When the rod 298 is fully retracted as in FIGS. 16E and 16F the counterweights 310 will be elevated to contact the limit stops 308, at which point no further elevation thereof is possible. Continued retraction of the rod 298 will cause a pulling action only on that portion of the tension member 280 leading to the picking head 206 and consequently the head 206 will be elevated on its own relative to the ground. The head can be raised clear of the ground for turning of the harvester, to clear an obstacle, or for travel to and from the field to be harvested.

Returning to FIGS. 7 and 10 it will be seen that a generally cylindrical brush 272 extending the width of the reel 222 is mounted thereabove almost directly on the centreline of the reel 222. The brush 272 will engage the tines 62 as they are directed thereinto by the cam track 270 and will force from the tine berries that have become lodged in the tines and debris, such as leaves or stems that were caught by the tines during harvesting. Most of the debris will be flung from the brush away from the reel 222 and its internal conveyor, while most of the heavier berries will drop into the internal conveyor.

It will be seen from the foregoing that the harvester of the present invention presents significant improvements and advantages over the prior art harvesters mentioned herein. The spacing of the tines improves berry stripping from the vines, while the increased length of the tines also improves berry stripping, especially, since improved cultivation techniques are resulting in stronger and bigger bushes which tend to decrease harvesting efficiency. By using two picking heads laterally spaced apart the harvester is capable of cutting a wider swath through a field, reducing the time required to harvest an entire field. By mounting the picking heads so that they precede the tractor during harvesting it is possible to harvest the field in any direction without substantial damage to unharvested bushes, contrary to the situation with the Bragg harvester. By mounting the blower at the discharge end of the angled portion of the conveyor 98 there is very little debris in the berries as they are collected in flats at the end of the conveyor 114. Any debris that reaches that stage is easily extracted by the operator riding on the platform 24. That operator will be fairly busy removing full flats and replacing them with empty flats since the harvester is capable of filling a flat in about 30 seconds as it passes through a typical field. The harvester of this invention should be capable of harvesting between 2500 and 3500 pounds of wild lowbush blueberries in a typical eight hour day. Of course the counterbalance system of the invention is very important as it greatly reduces the effective weight of the picking heads, reducing the potential for damage to the heads, and making it much easier to raise the heads to clear obstacles in their path or to raise the heads to effect a turning movement of the harvester or for travel to and from the fields.

We claim:

1. A harvester for lowbush berries comprising:
   (a) a plurality of independent picking heads offset longitudinally and laterally relative to a direction of travel, each picking head including frame means, a line-carrying harvester reel rotatably mounted in the frame means, and means supporting the frame means above the ground;
   (b) a truss section to which said picking heads are mounted, said truss section being pivotally connectable to a tractor;
   (c) tongue means pivotally connected to a forward portion of said truss section and connected to a respective trailing picking head;
   (d) first conveyor means extending laterally from within each of said harvester reels to remove from the reel berries deposited therein;
   (e) second conveyor means extending rearwardly from each first conveyor means to respective berry collection stations mounted on the tractor; and
   (f) counterbalance means mounted on the tractor for automatically reducing the weight of said picking heads.

2. The harvester of claim 1 wherein said counterbalance means includes, for each of said picking heads: a tension member attached at one end to the picking head and extending towards the tractor over a plurality of compression support members to counterweight means attached to the other end thereof; said counterweight means being movable vertically between upper and lower limits; and at least one adjustable tension support member engaging said tension member between a pair of said compression support members for adjusting said counterbalance means and for elevating or lowering the picking head as desired.

3. The harvester of claim 2 wherein a rotatable pulley is bearingly mounted at the upper end of each of said compression support members, said tension member passing over said pulley members.

4. The harvester of claim 3 wherein a rotatable pulley is provided at the upper end of said tension support member, said tension member passing under said last-mentioned pulley.

5. The harvester of claim 4 wherein said tension support member is a two-way hydraulic piston and cylinder arrangement, compression thereof tending to pull the tension member so as to raise the counterweight means to the upper limit thereof and then tending to pull the tension member further so as to raise the picking head from the ground, extension of the piston and cylinder arrangement tending to relax the tension member and to lower both the counterweight means and the picking head towards the lower limit thereof and the ground respectively.

6. The harvester of claim 1 wherein said tractor is a standard farm tractor suitably modified to operate in reverse, with said truss section and picking heads mounted at what would normally be the rear of the tractor, whereby said reels will pick the berries in advance of the tractor.

7. The harvester of claim 1 wherein said counterbalance means includes, for each of said picking heads: a tension member attached at one end to the picking head and extending towards the tractor over a plurality of pulley members to counterweight means attached to the other end thereof; said counterweight means being movable vertically between upper and lower limits; and an adjustable hydraulic cylinder member engaging said tension member between a pair of said pulley members for adjusting said counterbalance means and for elevating or lowering the picking head as desired.

8. The harvester of claim 7 wherein said counterweight means comprises a tube member mounted to the tractor, the tube member mounting said hydraulic cylinder member therein with one of said pulley members being attached to said hydraulic cylinder member, said tube member also mounting said pair of pulley members opposite each other at one end thereof whereby said tension member extends around one of said pair of pulley members, around the pulley member attached to said hydraulic cylinder member and around the other of said pair of pulley members for connection to said counterweight means.

9. The harvester of claim 1 wherein said first conveyor means includes a first portion internally mounted within the harvester reel and a second portion sloping laterally upwardly from the first portion, said second portion having a deflector shield mounted therebelow at the upper free end thereof to deflect berries exiting at the free end downwardly and inwardly relative thereto.

10. The harvester of claim 9 wherein said second conveyor means receives berries from said deflector shield and transports them rearwardly and upwardly for reception in container means Positioned below the free upper end thereof at the berry collection station.

11. The harvester of claim 10 including a blower and a flat nozzle positioned below the free upper end of said second Portion of said first conveyor means, said nozzle being directed towards said deflector shield to blow debris away from said deflector shield.

12. The harvester of claim 1 wherein the tines carried by each reel are mounted to a plurality of laterally extending, circumferentially spaced rods Pivotally mounted to the reel, each rod having a roller member secured thereto at one end thereof for cam-following engagement with cam means carried by said frame means, said cam means being shaped to ensure a generally vertical orientation for said tines as they approach the Plants to be harvested, a generally horizontal orientation as they pass through the Plants, a generally circumferential orientation as they elevate harvested berries to the top of the reel, and a generally upright orientation to thereafter engage rotating brush means near the top of the reel.

13. The harvester of claim 12 wherein said tines are formed from spring steel and are mounted in spaced relation to an elongated box member secured to each rod, each said box member carrying a rod member opposite the tines for retention of berries stripped from berry plants by said tines.

* * * * *

UNITED STATES PATENT AND TRADEMARK OFFICE
CERTIFICATE OF CORRECTION

PATENT NO. : 5,375,403
DATED : December 27, 1994
INVENTOR(S) : George E. Collins et al.

It is certified that error appears in the above-indentified patent and that said Letters Patent is hereby corrected as shown below:

In Column 12, claim 1, line 47, after "a" delete "line-carrying" and insert --tine-carrying--.

In Column 14, claim 10, line 20, after "means" delete "Positioned" and insert --positioned--.

In Column 14, claim 11, line 24, after "second" delete "Portion" and insert --portion--.

In Column 14, claim 12, line 29, after "rods" delete "Pivotally" and insert --pivotally--;

line 35, after "the" delete "Plants" and insert --plants--; and line 36, after "the" delete "Plants" and insert --plants--.

Signed and Sealed this

Fourth Day of April, 1995

Attest:

BRUCE LEHMAN

*Attesting Officer*     *Commissioner of Patents and Trademarks*